United States Patent Office 2,967,873
Patented Jan. 10, 1961

2,967,873
PROCESS FOR THE PRODUCTION OF ALIPHATIC AND CYCLOALIPHATIC MONOCARBOXYLIC ACID ALKYL ESTERS

Herbert Koch and Karl Erich Möller, Mulheim (Ruhr), Germany, assignors to Studiengesellschaft Kohle m.b.H., Mulheim (Ruhr), Germany No Drawing. Filed Apr. 15, 1958, Ser. No. 728,537

Claims priority, application Germany Apr. 24, 1957

13 Claims. (Cl. 260—410.9)

This invention relates to a process for the production of aliphatic and cycloaliphatic monocarboxylic acid alkyl esters.

German patent specification No. 942,987 relates to a process for the production of carboxylic acids from olefines, carbon monoxide and water in the presence of at least 90% sulphuric acid and also of anhydrous hydrogen fluoride, by itself or with the addition of boron trifluoride as catalyst, in which process the reaction is initially carried out in the liquid phase without the addition of water, whereafter the reaction product is taken up in water and is worked up in known manner.

It is known from Belgian patent specification No. 537,933 to produce carboxylic acids from olefines, preferably those branched at the double bond, and from carbon monoxide and water by initially reacting the olefines at elevated pressure with carbon monoxide without the addition of water in the presence of monohydroxy fluoboric acid, or a complex compound thereof with phosphoric acid or sulphuric acid and containing no or only a little water, in the liquid phase at temperatures below 100° C., and only then adding the stoichiometric quantity of water necessary for the reaction, it being possible to re-use the catalyst which is obtained simultaneously with the separation of the carboxylic acid, this catalyst being suitable for use directly. The reactions described above can if desired be carried out at a pressure higher than 100 atm. to suppress certain olefinic transpositions.

The first step in the carboxylic acid synthesis described in the aforementioned specifications of the foregoing patents can possibly be represented as the formation of a carbonium ion from the olefine by addition of a proton originating from the catalyst acid, and subsequent combination of this ion with the carbon monoxide to form an acyl ion of Formula I as follows:

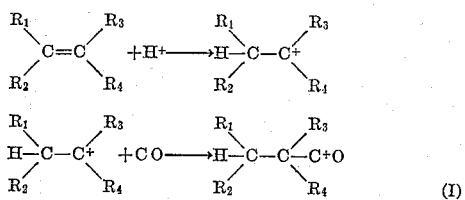

(I)

(R represents a hydrogen atom or an alkyl radical).

As indicated by H. P. Treffers and L. P. Hammet (Journal of American Chemical Society, vol. 59, page 1708 [1937]), such acyl ions are formed when different organic acids are dissolved in concentrated sulphuric acid.

In the two-stage carboxylic acid synthesis previously described, the addition of the water required in the second stage probably causes the conversion of the acyl ion which is first formed into an acid as follows:

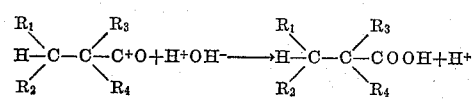

It is possible to imagine this second stage of the carboxylic acid synthesis being modified so that an alcohol, preferably methanol or ethanol, is added instead of water, with a view to obtaining the corresponding esters directly instead of the free carboxylic acids. In actual fact, it has already been stated that it is possible to esterify carboxylic acids by dissolving them in 100% sulphuric acid and pouring the resulting solution into an alcohol (Journal of American Chemical Society 63, page 2431 [1941], vol. 11).

Processes have also become known according to which carboxylic acid esters are produced by a one-stage reaction of olefines, carbon monoxide and alcohols. For example, U.S.A. patent specification No. 1,979,717 describes the production of methyl propionate and ethyl propionate from ethylene, carbon monoxide and methanol or ethanol, and the production of ethyl butyrate from propylene, carbon monoxide and ethanol. 325° C. and 700 atm. are mentioned as advantageous reaction conditions.

According to W. Reppe and H. Kröper (German patent specifications Nos. 879,987 and 915,567), carboxylic acid esters can be obtained by reacting olefines with carbon monoxide and alcohols in the presence of nickel carbonyl as catalyst. The reaction temperatures in this process are between 230 and 280° C. and the carbon monoxide pressures between 100 and 200 atm.

The processes referred to above all work at comparatively high pressures and temperatures, so that undesirable secondary reactions can be avoided only with difficulty, and, in particular, the reaction vessels are heavily corroded.

It is not a straightforward matter to adapt the two-stage procedure used in the production of carboxylic acids to the production of the corresponding esters. It is true that the reaction product which is obtained in a first stage from an olefine and carbon monoxide, for example by using concentrated sulphuric acid, and in which the acyl ion is probably present, can be decomposed in a second stage with an alcohol, so as to give the desired carboxylic acid ester. Such a process is not however commercially important, since the concentrated sulphuric acid serving as catalyst for the carbonylation is also esterified. The same difficulties arise when mixtures of monohydroxy fluoboric acid with phosphoric acid or sulphuric acid are used as catalysts.

If the two-stage carboxylic acid synthesis is carried out with a catalyst comprising monohydroxy fluoboric acid H[BF₃OH] by itself or in admixture with sulphuric acid or phosphoric acid, it is possible in the second stage of the process, by adding the stoichiometrically necessary amount of water, to separate out the catalyst from the carboxylic acid, which catalyst can be used again.

Boron fluoride, which combines with water in the molar ratio of 1:1 to form monohydroxy fluoboric acid and forms the hydronium salt of the acid, namely $$(H_3O)^+(BF_3OH)^-$$

with a second molecule of water, combines with alcohols to form the strongly acid compounds $H^+(BF_3OR)^-$ and 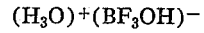 $(H.ROH)^+(BF_3OR)^-$, the properties of which correspond exactly to those of the BF₃ hydrate (see Gmelins Handbuch der Anorganischen Chemie, 8th edition, system No. 13, borine, supplementary volume 1954). On account of their anology to the hydroxy compounds, these alkoxy fluoboric acids are also suitable as catalysts for the reaction of olefines with carbon monoxide, and, by subsequent addition of the corresponding alcohol, they produce the carboxylic acid esters, sometimes with quite a good yield. It is, however, not possible for the catalyst to be separated in such a simple way from the reaction product, to allow the catalyst to be used for further experiments, as is the case in the synthesis of the free carboxylic acids with monohydroxyfluoboric acid. The separation of the boron fluoride from the organic phase containing the ester can be effected by adding water to the reaction product, but it is then necessary for the boron fluoride, which is then combined with water, to be recovered by means of a separate working-up procedure.

A process has now been discovered which does not show the aforementioned disadvantages. If, in a first reaction stage, an olefine and carbon monoxide are reacted in the presence of a catalyst mixture comprising hydroxy and alkoxy-fluoboric acids, for example, which contain at least one mol of water plus alcohol and at the most 2 mols thereof per mol of boron fluoride, and if in the second reaction stage alcohol is again added, preferably in stoichiometric quantities, for separating esters and catalyst, a complicated and costly recovery process for the catalyst is not necessary, since the catalyst separates cleanly from the reaction product on the addition of the stoichiometrically required quantity of alcohol.

On the basis of the existing state of the art, it was not to be anticipated that, when the process of the invention is used, the reaction would proceed preponderantly in the direction of ester formation and at the same time make it possible to obtain a clean separation of the catalyst. The proportions of the two products of the process (ester and free carboxylic acids) can be varied within certain limits, which are chiefly determined by the ratio of the hydroxy and alkoxy-fluoboric acid components in the catalyst and by the structure of the reacted olefine. As an average value for the composition of the final products, experiments have produced 90% of ester and only 10% of carboxylic acids. In the most unfavourable case, a ratio between esters and free carboxylic acids of 5:1 was found with a ratio between alkoxy and hydroxy-fluoboric acids in the catalyst of 1.7:1, while, with a catalyst of the same composition and in the reaction of another olefine, only 2.5% of carboxylic acids were obtained in addition to 68% of esters.

The surprising way in which the reaction proceeds in favour of the ester formation can be explained by the fact that the chemically combined water in the catalyst mixture has a substantially lower tendency to combine with the acyl ion formed in the first stage from olefine and carbon monoxide than has the chemically combined alcohol. This can be readily explained on the basis that, after the completion of the first stage of the synthesis, i.e. the incorporation of the carbon monoxide, an equilibrium exists in the reaction mixture in which the acyl ions have a reciprocal action with the hydroxyl and alkoxyl groups of the catalyst. The bonding of the alkoxyl radical to the boron fluoride is then apparently substantially weaker than that of the hydroxyl radical, i.e. the alkoxyl radical can preferentially react with the acyl ion. Consequently, it is the ester which predominates in the final product.

The composition of the catalyst mixtures used in accordance with the invention must be adapted to the intended reactions, since the various olefines used as starting material require different catalyst activities under otherwise the same reaction conditions; also, in the reaction of one and the same olefine, a catalyst of lower efficacy requires a somewhat higher reaction temperature. It has been shown by experiments that this gradation in the efficacy can be achieved by varying the proportions of the components used for producing the catalyst. It is however essential that the catalyst mixtures still do not contain any free water or free alcohol, since otherwise the first stage of the process, which is the incorporation of carbon monoxide, no longer proceeds smoothly. Consequently, mixtures which are suitable as catalyst for the process of the invention are those which conform to the general formulae:

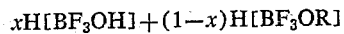

and

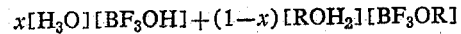

In these formulae, $x$ represents the molar fraction and R represents an aliphatic or cycloaliphatic hydrocarbon radical. The composition of catalyst mixtures with which excellent results have been produced is more fully described in the following examples. The formulae indicate that the catalyst are to contain at least 1 mol of water plus alcohol and at the most 2 mols thereof, per mol of boron fluoride. All transitional stages between these limits are of course also suitable. It is advisable to keep $x$ not smaller than 0.2 and not larger than 0.8. The value of $x$ is preferably between 0.2 and 0.6.

Suitable as starting material for the process according to the invention are aliphatic and alicyclic monoolefines with at least 6 carbon atoms. When olefines containing fewer than 6 carbon atoms are used, the catalyst cannot be separated out cleanly in the second stage of the process. Examples of olefine hydrocarbons with which very good results are produced are straight-chain olefins from n-hexene upwards, it being possible for the double bond to occupy an end position or a middle position. Olefines which can be reacted equally smoothly are branched olefines, such as for example 2-methyl pent-1-ene, diisobutene, isododecenes, isopentadecenes and isononenes prepared by polymerisation of propene, olefines from cleavage oil products, and also the dimers produced by the process of K. Ziegler and collaborators with an aluminium alkyl as catalyst, such as the dimers of n-hexadec-1-ene, i.e. 2-tetradecyl octadec-1-ene. Example of cyclic olefines which are suitable as starting materials for use in the process of the invention are cyclohexene, methyl cyclohexene, bicyclo-(1,2,2)-hept-2-ene, α-pinene, camphene and octahydronaphthalene.

Methanol, ethanol and n-propanol are alcohols which are suitable as complex formers for the production of the catalysts and, added in an approximately stoichiometric quantity in the second stage, cause the formation of the esters and their separation from the catalyst, which can be used again. The clear separation of the catalyst is not however successfully effected with alcohols of higher molecular weight. Moreover, some of these higher alcohols react in an undesirable manner.

The reaction conditions necessary for the process of the invention are extraordinarily gentle. Certain differences in the optimum reaction temperatures are found to depend on the structure of the olefine to be reacted and the activity of the catalyst. The preferred temperature range has been found to be between 0° and 60° C. and a temperature higher than 100° C. is not essential in any case, though it can be used if desired. Moreover, the process does not set any high standards as regards the carbon monoxide pressure, since good yields of esters are obtained at as little as 20 to 30 atm. The range between 50 and 100 atm. can be considered to be the preferred pressure range. In order to suppress isomerisation and cleavage reactions, it is however desirable in certain circumstances to carry out the reaction at an even higher pressure, for example at 200 or even 300 atm.

The reaction time which is necessary for the first stage of the process, i.e. the incorporation of carbon monoxide, is mainly dependent on the reactivity of the olefine being reacted and the activity of the catalyst employed. In most cases, the reaction takes place within a few minutes and care must be taken to ensure effective dissipation of the heat of reaction liberated, to avoid an undesirably high rise in temperature.

After the reaction of the olefine with the carbon monoxide has been completed, the reaction product of the first stage is removed from the pressure vessel and mixed in portions with the alcohol until the catalyst has separated out from the organic layer, which is of lower specific gravity. This separation is assisted if the reaction product is diluted with a hydrocarbon of low boiling point, for example light benzine, benzene, cyclohexane or commercial n-hexane. The separated catalyst can immediately be used again for the next reaction. A small proportion of boron fluoride remains in the organic layer containing the required reaction products, and this boron fluoride can be removed by washing with a further quantity of alcohol. The washings can then be used for the decomposition of the first-stage reaction product forming in the next operation.

The carboxylic acid ester mixture formed as main product in the reaction can be isolated in the usual way. It has proved advantageous for the reaction product obtained to be subjected to rectification and for the free carboxylic acids formed in a small proportion in addition to the esters to be separated via their alkali metal salts. The formation of small proportions of free carboxylic acids gradually reduces the water content of the catalyst, and this water must consequently always be replenished after one or perhaps several operations.

The following examples further illustrate the invention.

*Example 1*

1 mol (154 g.) of undec-1-ene was sprayed over a period of 30 minutes at a temperature of 10–20° C. into an autoclave with a capacity of 2 litres and provided with a magnetic stirrer device (material of the autoclave: chrome-nickel steel V4A Extra), the autoclave containing 250 cc. of a catalyst having the composition of 1.5 mols of $H(BF_3OH)$ and 2.5 mols of $H(BF_3OCH_3)$ and being at a carbon monoxide pressure of 100 atm. After a total reaction time of 2 hours, the reaction product was removed and diluted with 0.5 litre of n-hexane. By adding 1 mol of methanol, the catalyst was separated, this catalyst being ready for use in the next batch. The small proportion of $BF_3$ still remaining in the lighter organic phase was washed out with an additional mol of methanol. After a subsequent washing with water, the n-hexane was distilled off through a column with simultaneous azeotropic separation of the water. During further rectification carried out in vacuo, the methyl esters of the $C_{12}$ acids distilled over in the range from 125–140° C. at 20 mm. Hg. Based on the olefine employed, 53% of the theoretical were obtained. From the distillation residue, the carboxylic acids which were formed in addition to the esters were separated out by way of their alkali metal salts. The amount of these acids was 10%, based on the olefine employed, this 10% being made up of 6% of $C_{12}$ acids and 4% and $C_{23}$ acids. The high-boiling non-acidic components consisted substantially of the methyl esters of the $C_{23}$ acids.

The catalyst originating from the first operation served under the same conditions for the conversion of another mol of undec-1-ene. From the reaction mixture diluted with n-hexane, the catalyst was separated out by adding the methanol used for the washing in operation 1, and this catalyst was used in a third operation. Working up yielded 55% of methyl esters of the $C_{12}$ acids, and also 9% of $C_{12}$ acids and $C_{23}$ acids and a few percent of methyl esters of the $C_{23}$ acids.

The series of experiments was extended to a total of 14 batches without the efficacy of the catalyst having suffered on conclusion of these experiments. To compensate for the consumption of water due to the formation of the small proportions of free carboxylic acids, corresponding amounts of water were added to the catalyst after a few operations. During the operations carried out in this series of experiments the reaction temperature was varied between 10 and 50° C. without any difference in the yields being produced. The carbon monoxide pressure was 250 atm. in two operations carried out with a reaction temperature from 10–20° C. and this resulted in a lowering of the proportion of the tertiary carboxylic acid esters formed by isomerisation.

*Example 2*

A catalyst having the composition of 1.5 mols of $H(BF_3OH)$ and 2.5 mols of $H(BF_3OC_2H_5)$ was used for the reaction of undec-1-ene. 1 mol (154 g.) of undec-1-ene was sprayed over a period of 30 minutes into a 2-litre stirrer-type autoclave at a carbon monoxide pressure of 100 atm. and a temperature from 12 to 20° C. The reaction mixture was removed after two hours and diluted with 0.5 litre of n-hexane; the resulting material was mixed with 1 mol of ethanol, whereupon the catalyst separated out as a lower layer. The catalyst was used for another three reactions, using 1 mol of undec-1-ene in each case, without its efficacy being reduced.

The reaction mixture was worked up as in Example 1 by fine fractionation and separation of the carboxylic acids via their alkali metal salts. The yield of ethyl esters of the $C_{12}$-acids was 58% of the theoretical, based on the olefine introduced; in addition 8% of $C_{12}$ carboxylic acids were obtained. The fractions with higher boiling points contained the ethyl esters of the $C_{23}$-acids and small amounts of the $C_{23}$-acids themselves.

*Example 3*

With the aid of a catalyst having the composition of 1.5 mols of $H(BF_3OH)$ and 2.5 mols of $H(BF_3OC_3H_7)$, 1 mol of undec-1-ene was reacted in a 2-litre autoclave over a period of 3 hours at a carbon monoxide pressure of 100 atm. and a temperature of 16 to 22° C. For working-up purposes, 1 mol of n-propanol was added to the reaction mixture diluted with n-hexane, whereby the catalyst could be separated. It was found by analysis of the organic layer that n-propyl esters of $C_{12}$-acids had formed in a proportion of 54% of the theoretical, based on the undecene introduced. There were also obtained 5% and 6% respectively of the free $C_{12}$ and $C_{23}$-carboxylic acids, and in addition 11% of n-propyl esters of $C_{23}$-acids were obtained.

It was possible in this series of experiments also to use the catalyst separated out in each case for the next operation. After three operations, it was not possible to detect any decrease in the efficacy.

*Example 4*

250 cc. of a catalyst with the composition of 1 mol of $H(BF_3OH)$ and 3 mols of $H(BF_3OCH_3)$ were placed in a 2-litre autoclave having a magnetic stirrer device, a carbon monoxide pressure of 100 atm. was produced therein and 1 mol (196 g.) of tetradec-1-ene was sprayed into the autoclave at a temperature of 21–29° C. After a reaction time of 2 hours, the reaction mixture was removed and diluted with 0.5 litre of n-hexane. The catalyst which separated out on addition of 1 mol of methanol could be used for two additional operations without showing any loss in efficacy. The upper organic phase was washed with 1 mol of methanol and this washing methanol was then used for separating the catalyst in operation 2. The working-up of the reaction mixture which had been washed with water until neutral and dehydrated by azeotropic distillation showed that 70% of methyl esters of the $C_{15}$-acids and 8% of $C_{15}$-acids were formed, based on the olefine which was employed. The fraction of higher boiling point contained the methyl esters of $C_{29}$-acids. The small amount of water used up in forming the carboxylic acid was added to the catalyst after each operation.

*Example 5*

250 cc. of catalyst with the composition of 1.5 mols of $H(BF_3OH)$ and 2.5 mols of $H(BF_3OCH_3)$ were placed in a 2-litre autoclave with a magnetic stirrer device and 1 mol of oct-1-ene was injected into the autoclave at a carbon monoxide pressure of 100 atm. and a temperature of 21–29° C. The reaction mixture removed after an experimental time of 2 hours was mixed with 0.5 litre of n-hexane and the catalyst separated out by adding 1 mol of methanol. Rectification of the organic phase led to the isolation of 50% of methyl esters of the $C_9$-acids and 20% of methyl esters of the $C_{17}$-acids, based on the amount of olefine introduced. In addition, 12% of a mixture of $C_9$ and $C_{17}$ carboxylic acids were obtained.

The separated catalyst served for two additional operations, which yielded similar results without the catalyst becoming less efficient. The water used up by formation of carboxylic acid was made up after each operation.

*Example 6*

1 mol (126 g.) of a commercial isononene mixture obtained by trimerisation of propene was reacted with 250 cc. of a catalyst of the composition of 1 mol of $$H(BF_3OH)$$

and 3 mols of $H(BF_3OCH_3)$ in a 2-litre autoclave with a magnetic stirrer device at a carbon monoxide pressure of 100 atm. and a temperature of 17–25° C. After a reaction time of 1 hour, the reaction mixture was removed, diluted with 0.5 litre of n-hexane and mixed with 1 mol of methanol to separate out the catalyst. The working up of the organic phase was carried out as in the preceding examples and yielded 77% of methyl esters of $C_{10}$-acids, 8% of methyl esters of $C_{19}$-acids and also 5% of a mixture of $C_{10}$ and $C_{19}$ carboxylic acids, based on the amount of olefine which was used. The separated catalyst was used again in an extensive series of experiments, for a total of 13 operations, during which its efficacy remained constant. The water used up in the formation of the free carboxylic acids was replaced after each three operations. The carbon monoxide pressure used in this series of experiments was varied within the range 30–100 atm. without considerably influencing the course of the reaction and the composition of the reaction mixture.

*Example 7*

260 cc. of a catalyst with the composition of 1.5 mols of $(H_3O)(BF_3OH)$ and 1.5 mols of $(CH_3OH_2)(BF_3OCH_3)$ were placed in a 2-litre autoclave equipped with a magnetic stirrer, carbon monoxide was introduced to a pressure of 100 atm. and 1 mol of diisobutene was injected at a temperature of 45–55° C. After a reaction time of 2 hours, the reaction mixture was removed and mixed with 0.5 litre of n-hexane, whereupon some of the catalyst separated out. The remainder was separated out by adding 0.5 mol of methanol. The reaction mixture was worked up as previously repeatedly described, and yielded 55% of methyl esters of the $C_9$-acids, based on the amount of olefine employed, and also 8% of $C_9$-acids.

In operation 2, which was carried out with the separated catalyst under the same conditions, 10% of $C_9$-acids and 60% of methyl esters of the $C_9$-acids were formed. The catalyst, on being separated out again, showed an unchanged high activity during 6 additional operations carried out under similar conditions. The yield of methyl esters of the $C_9$-acids fluctuated between 50 and 80%. The proportion of free carboxylic acids in all the operations was in the region of 10%.

*Example 8*

255 cc. of a catalyst having the composition of 0.5 mol $(H_3O)(BF_3OH)$ and 1 mol $(CH_3OH_2)(BF_3OCH_3)$ were placed in a 2-litre autoclave with a magnetic stirrer device and 112 g. (1 mol) of 2-ethyl hex-1-ene were injected under a carbon monoxide pressure of 50 atm. and at a temperature of 45° C. The reaction mixture was removed after an experimental time of 2 hours, mixed with 0.5 litre of light benzine and the catalyst separated out by adding 1 mol of methanol. Rectification of the organic phase after washing with another mol of methanol led to the isolation of the homogeneous methyl ester of α-methyl-α-ethyl caproic acid in a yield of 82% based on the amount of olefine introduced. In addition, 15% of α-methyl-α-ethyl caproic acid were obtained.

The separated catalyst served for two further operations which yielded similar results without the efficacy of the catalyst being reduced. The water used up by formation of carboxylic acid was replenished after the second operation.

*Example 9*

250 cc. of catalyst with the composition of 0.5 mol of $(H_3O)(BF_3OH)$ and 1 mol of $(CH_3OH_2)(BF_3OCH_3)$ were placed in a 2-litre autoclave equipped with a magnetic stirrer device and 136 g. (1 mol) of octahydronaphthalene were injected into the autoclave under a carbon monoxide pressure of 60 atm. and at a temperature of 45° C. The reaction mixture removed after an experimental period of 4 hours was mixed with 0.5 litre of technically pure benzene and the catalyst was separated out by adding 1 mol of methanol. Rectification of the organic phase, after washing with another mol of methanol, led to the isolation of the homogeneous methyl ester of decahydronaphthalene carboxylic acid-9 in a yield of 81%, based on the amount of olefine introduced. In addition, 9% of decahydronaphthalene carboxylic acid-9 were obtained.

The separated catalyst served for another two operations which yielded similar results without the efficacy of the catalyst being reduced. The water used up by formation of carboxylic acid was replenished after each operation.

*Example 10*

250 cc. of a catalyst with the composition of 1 mol of $H(BF_3OH)$ and 5 mols of $H(BF_3CH_3)$ were placed in a 2-litre autoclave equipped with a magnetic stirrer device. With a carbon monoxide pressure of 150 atm. and a reaction temperature of 30° C., 308 g. (1 mol) of an isodocosene (2-nonyl-tridec-1-ene) produced by dimerisation of n-undec-1-ene with the aid of aluminium alkyl and diluted with 250 cc. of n-heptane (commercial grade) were then injected into the autoclave. The reaction product removed after an experimental time of 2 hours was mixed with another 500 cc. of n-heptane and the catalyst was separated by adding 1 mol of methanol. The small proportion of $BF_3$ still remaining in the upper organic phase was removed from this phase by washing with another mol of methanol.

To separate out the small proportion of carboxylic acids formed concurrently with the methyl esters, the reaction product was passed through a column filled with an ion exchanger of the Amberlite IRA–401 type. The carboxylic acid held by the ion exchanger was thereafter dissolved out with methanolic caustic potash solution and liberated by acidifying with hydrochloric acid. In this way it was found that 10% of a $C_{23}$-acid had been formed, this acid being in fact α-methyl-α-nonyl tridecane acid-1.

265 g. of the methyl ester of this $C_{23}$-acid could be isolated from the neutral oil after the heptane had been distilled off, this corresponding to a yield of 72%. The separated catalyst served for two further operations, which were carried out under the same reaction conditions. The reaction products were also worked up by using the Amberlite IRA–401 ion exchanger and had showed a composition similar to that of the first experiment without the catalyst losing any of its efficacy. The water used up by formation of carboxylic acid was replenished after each operation.

*Example 11*

The olefine reacted in this experiment was a triacontene $C_{30}H_{60}$, which had been produced by dimerising n-pentane-dec-1-ene by means of aluminium alkyl and had the structure of a 2-tridecyl-heptadec-1-ene. 420 g. (1 mol) of triacontene, dissolved in 800 cc. of commercial n-heptane, were forced, over a period of 1 hour and at a temperature of 45° C., into a 2-litre autoclave of the magnetic stirrer type in which were 350 cc. of a catalyst with the composition of 1 mol of $H(BF_3OH)$ and 4 mols of $H(BF_3OCH_3)$ and in which there was a carbon monoxide pressure of 200 atm. After a reaction time of 4 hours, the reaction product was removed and mixed with 1 mol of methanol, whereupon the catalyst was separated out, this catalyst being capable of further use.

The separation of the carboxylic acids from the methyl esters was effected, as already described in Example 10, by means of an ion exchanger of the Amberlite IRA–401 type. 360 g. of the methyl ester of α-methyl-α-tridecyl heptadecanic acid-1, corresponding to a yield of 75%, could be isolated from the neutral oil after the heptane had been distilled off.

45 g. of the $C_{31}$-acid itself had been formed, this amount corresponding to 10% of the theoretical. The series of experiments was extended to a total of 4 operations with constant re-use of the catalyst, and in all cases yields between 70 and 80% of the theoretical of methyl esters of the $C_{31}$-acid were obtained. The water used up by formation of carboxylic acid was replenished after each second operation.

What we claim is:

1. In the process for the production of aliphatic and cycloaliphatic monocarboxylic acid alkyl esters by reacting an olefine having at least 6 carbon atoms in its molecule with carbon monoxide and an aliphatic alcohol of low molecular weight in the presence of an acid catalyst containing boron fluoride, the improvement which comprises in a first stage reacting an olefine with carbon monoxide at an elevated pressure in the presence of a catalyst consisting of a mixture of a hydroxy fluoboric acid and an alkoxy fluoboric acid, both in significant amounts, said catalyst containing at least 1 mol and at the most 2 mols of water in bound form plus an alcohol which is a member selected from the group consisting of methanol, ethanol and propanol in bound form per mol of boron fluoride, thereafter in a second stage adding to the reaction mixture an alcohol which alcohol is identical with the alcohol component of the catalyst mixture for separating the catalyst from the reaction product which product consists of a major amount of a mono-carboxylic acid alkyl ester and a minor amount of a free mono-carboxylic acid and separately recovering said ester and said acid.

2. Process according to claim 1 which comprises effecting said second stage in the presence of an inert hydrocarbon as diluent.

3. Process according to claim 2 wherein said hydrocarbon is a member selected from the group consisting of light benzene, benzene, cyclohexane, n-heptane and commercial n-hexane.

4. Process according to claim 1 wherein said catalyst is a mixture of the composition $xH[BF_3OH]+(1-x)H[BF_3OR]$ to
$\qquad x[H_3O][BF_3OH]+(1-x)[ROH_2][BF_3OR]$ in which $x$ represents the molar fraction and has a value of less than 1 and R is an alkyl radical selected from the group consisting of methyl, ethyl and propyl.

5. Process according to claim 4 wherein $x$ has a value of from 0.2 to 0.8.

6. Process according to claim 1 in which said olefine is a member selected from the group consisting of normal olefines with a double bond in the end position, normal olefines with a double bond in the middle position, branched olefines and cyclic olefines.

7. Process according to claim 1 which comprises adding said alcohol in stoichiometric quantities for separating the catalyst from the reaction product.

8. Process according to claim 1 in which the reaction is carried out at a temperature of between −20 and 100° C.

9. Process according to claim 8 in which the reaction is carried out at a temperature of between 0 and 60° C.

10. Process according to claim 1 in which the reaction is carried out at a pressure of between 20 and 300 atm.

11. Process according to claim 10 in which the reaction is carried out at a pressure of between 50 and 100 atm.

12. Process according to claim 1 which comprises retifying the reaction product and recovering the free monocarboxylic acids in the form of their alkali metal salts.

13. Process according to claim 1 which comprises recovering the free mono-carboxylic acids by the use of ion-exchangers.

References Cited in the file of this patent
UNITED STATES PATENTS

| | | |
|---|---|---|
| 2,006,734 | Edlund | July 2, 1935 |
| 2,253,525 | Loder | Aug. 26, 1941 |
| 2,771,480 | Chasanov et al. | Nov. 20, 1956 |

OTHER REFERENCES

Willemart: "Bull. Soc. Chim. France" (1947), pages 152 to 157.